(12) United States Patent
Konishi

(10) Patent No.: US 9,846,802 B2
(45) Date of Patent: *Dec. 19, 2017

(54) PASSENGER COUNTING SYSTEM, PASSENGER COUNTING METHOD AND PASSENGER COUNTING PROGRAM

(71) Applicant: NEC Corporation, Minato-ku, Tokyo (JP)

(72) Inventor: Yusuke Konishi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/278,262

(22) Filed: Sep. 28, 2016

(65) Prior Publication Data

US 2017/0017832 A1    Jan. 19, 2017

Related U.S. Application Data

(63) Continuation of application No. 14/435,326, filed as application No. PCT/JP2013/005368 on Sep. 11, 2013, now Pat. No. 9,477,881.

(51) Int. Cl.
*G06K 9/00* (2006.01)
*H04N 7/18* (2006.01)
(Continued)

(52) U.S. Cl.
CPC ..... *G06K 9/00255* (2013.01); *G06K 9/00362* (2013.01); *G06K 9/00369* (2013.01);
(Continued)

(58) Field of Classification Search
None
See application file for complete search history.

(56) References Cited

U.S. PATENT DOCUMENTS 4,713,714 A    12/1987   Gatti et al. ................... 360/137
7,616,436 B2   11/2009   DeMoss et al. ......... 361/679.34
(Continued)

FOREIGN PATENT DOCUMENTS

JP    2002-133463 A    5/2002
JP     2002133463 A    5/2002
(Continued)

OTHER PUBLICATIONS

Crowded pedestrian counting at bus stops from perspective transformations of foreground areas. Garcia-Bunster et al. Jul. 2011.*
(Continued)

*Primary Examiner* — Delomia L Gilliard

(57) ABSTRACT

A passenger counting system that can count correctly the number of persons present in a vehicle, including persons sitting on the back seat, is provided. The passenger counting system includes an image capturing device 11 which is arranged outside the vehicle and which captures an image of the vehicle from the lateral direction of the vehicle, an image acquisition unit 31 that controls the image capturing device 11 and acquires an image in which the inside of the vehicle is captured as an input image, a profile detection unit 32 that detects a profile of a person from a partial image obtained from the input image based on an image feature amount calculated by using the partial image and outputs a detection result, and a passenger number determination unit 33 that determines the number of persons present in the vehicle based on the detection result.

5 Claims, 5 Drawing Sheets

(51) Int. Cl.
*G06T 1/00* (2006.01)
*H04N 5/247* (2006.01)
*H04N 5/232* (2006.01)

(52) U.S. Cl.
CPC ........... *G06T 1/0007* (2013.01); *H04N 5/232* (2013.01); *H04N 5/247* (2013.01); *H04N 7/188* (2013.01); *G06T 2207/10004* (2013.01); *G06T 2207/30196* (2013.01); *G06T 2207/30201* (2013.01); *G06T 2207/30232* (2013.01); *G06T 2207/30242* (2013.01); *G06T 2207/30268* (2013.01)

(56) References Cited

U.S. PATENT DOCUMENTS

| | | | |
|---|---|---|---|
| 7,839,639 B2 | 11/2010 | Najbert | 361/695 |
| 7,967,281 B2 | 6/2011 | Rawson | 267/141.7 |
| 8,474,804 B2 | 7/2013 | Masterson et al. | 267/141 |
| 2006/0062435 A1* | 3/2006 | Yonaha | G06T 11/60 382/118 |
| 2007/0195497 A1 | 8/2007 | Atkins | |
| 2008/0175438 A1 | 7/2008 | Alves | G08G 1/0175 382/105 |
| 2009/0284910 A1 | 11/2009 | Heo et al. | 361/679.36 |
| 2010/0027231 A1 | 2/2010 | Chang et al. | 361/807 |
| 2010/0192335 A1 | 8/2010 | Ukai et al. | 24/591.1 |
| 2011/0001280 A1 | 1/2011 | Huang | 267/140.4 |
| 2011/0158537 A1* | 6/2011 | Uno | G06K 9/00228 382/190 |
| 2012/0136477 A1 | 5/2012 | Merrow et al. | |
| 2012/0269389 A1* | 10/2012 | Nakano | G06K 9/00288 382/103 |
| 2015/0107948 A1 | 4/2015 | Gustavsson | 188/380 |

FOREIGN PATENT DOCUMENTS

| | | |
|---|---|---|
| JP | 2004-70834 A | 3/2004 |
| JP | 2006-120128 A | 5/2006 |
| JP | 2006-339960 A | 12/2006 |
| JP | 2007-505425 A | 3/2007 |
| JP | 3130774 U | 4/2007 |
| JP | 2008/33670 A | 2/2008 |
| JP | 2008033670 A | 2/2008 |
| JP | 2008-171515 A | 7/2008 |
| JP | 2008-182459 A | 8/2008 |
| JP | 2009-70530 A | 4/2009 |
| JP | 2011-524059 A | 8/2011 |
| JP | 2012-158968 A | 8/2012 |
| JP | 2012158935 A | 8/2012 |
| JP | 2012158968 A * | 8/2012 |
| WO | 2008/099146 A1 | 8/2008 |
| WO | 2011/128668 A2 | 10/2011 |

OTHER PUBLICATIONS

Japanese Office Action for JP Application No. 2013-079740 dated Feb. 12, 2014 with English Translation.
International Search Report for PCT Application No. PCT/JP2013/005368, dated Dec. 10, 2013.

* cited by examiner

PASSENGER COUNTING SYSTEM, PASSENGER COUNTING METHOD AND PASSENGER COUNTING PROGRAM

REFERENCE TO RELATED APPLICATION

The present application is a continuation application of U.S. patent application Ser. No. 14/435,326 filed on Apr. 13, 2015, which is a National Stage Entry of international application PCT/JP2013/005368, filed Sep. 11, 2013, which claims the benefit of priority from Japanese Patent Application 2012-231729 filed on Oct. 19, 2012, the disclosures of all of which are incorporated in their entirety by reference herein.

TECHNICAL FIELD

The present invention relates to a system that counts the number of persons present in a vehicle based on an input image obtained by capturing an image of the vehicle from outside of the vehicle by a camera, in particular to a passenger counting system, a passenger counting method, and a passenger counting program, which count the number of persons present in a vehicle by detecting profiles of persons from an input image obtained by capturing an image of the vehicle from outside of the vehicle from the lateral direction of the vehicle.

BACKGROUND ART

As a technique related to the present invention, a system is proposed which counts the number of persons present in a vehicle based on an input image obtained by capturing an image of the vehicle from outside of the vehicle by a camera. PLT 1 and PLT 2 describe techniques that count the number of persons present in a vehicle by detecting faces and heads of persons based on an input image obtained by capturing an image of the vehicle by a camera from a position in front of the vehicle.

CITATION LIST

Patent Literature

PLT 1: WO 2008/099146
PLT 2: WO 2011/128668

SUMMARY OF INVENTION

Technical Problem

The techniques described in PLT 1 and PLT 2 have a problem that the number of persons sitting on the back seat of the vehicle may not be able to count correctly because the input image does not have a clear image of faces and heads of persons sitting on the back seat of the vehicle.

Therefore, an object of the present invention is to provide a passenger counting system, a passenger counting method, and a passenger counting program, which can correctly count the number of persons present in a vehicle, including persons sitting on the back seat.

Solution to Problem

The passenger counting system according to the present invention includes an image capturing device which is arranged outside a vehicle and which captures an image of the vehicle from the lateral direction of the vehicle, an image acquisition means that controls the image capturing device and acquires an image in which the inside of the vehicle is captured as an input image, a profile detection means that detects a profile of a person from a partial image obtained from the input image based on an image feature amount calculated by using the partial image and outputs a detection result, and a passenger number determination means that determines the number of persons present in the vehicle based on the detection result.

The passenger counting system according to the present invention includes an image capturing device which is arranged outside a vehicle and which captures an image of the vehicle from the lateral direction and the front direction of the vehicle, an image acquisition means that controls the image capturing device, acquires an image in which the inside of the vehicle is captured from the lateral direction as a lateral direction input image, and acquires an image in which the inside of the vehicle is captured from the front direction as a front input image, a face detection means that detects a profile of a person from a partial image in the lateral direction input image and detects a frontal face of a person from a partial image in the front input image based on image feature amounts calculated by using the partial images obtained from the lateral direction input image and the front input image and outputs a detection result, and a passenger number determination means that determines the number of persons present in the vehicle based on the detection result.

The passenger counting method according to the present invention captures an image of a vehicle from the lateral direction of the vehicle by an image capturing device arranged outside the vehicle, control the image capturing device, acquires an image in which the inside of the vehicle is captured as an input image, detects a profile of a person from a partial image obtained from the input image based on an image feature amount calculated by using the partial image, outputs a detection result, and determines the number of persons present in the vehicle based on the detection result.

The passenger counting program according to the present invention causes a computer to execute image capturing processing that captures an image of a vehicle from a lateral direction of the vehicle by an image capturing device arranged outside the vehicle, image acquisition processing that controls the image capturing device and acquires an image in which inside of the vehicle is captured as an input image; profile detection processing that detects a profile of a person from a partial image obtained from the input image based on an image feature amount calculated by using the partial image and outputs a detection result, and passenger number determination processing that determines the number of persons present in the vehicle based on the detection result.

Advantageous Effects of Invention

According to the present invention, it is possible to count correctly the number of persons present in a vehicle, including persons sitting on the back seat.

DESCRIPTION OF EMBODIMENTS

Next, exemplary embodiments of the passenger counting system according to the present invention will be described with reference to the drawings.

Exemplary Embodiment 1

Figure 1:
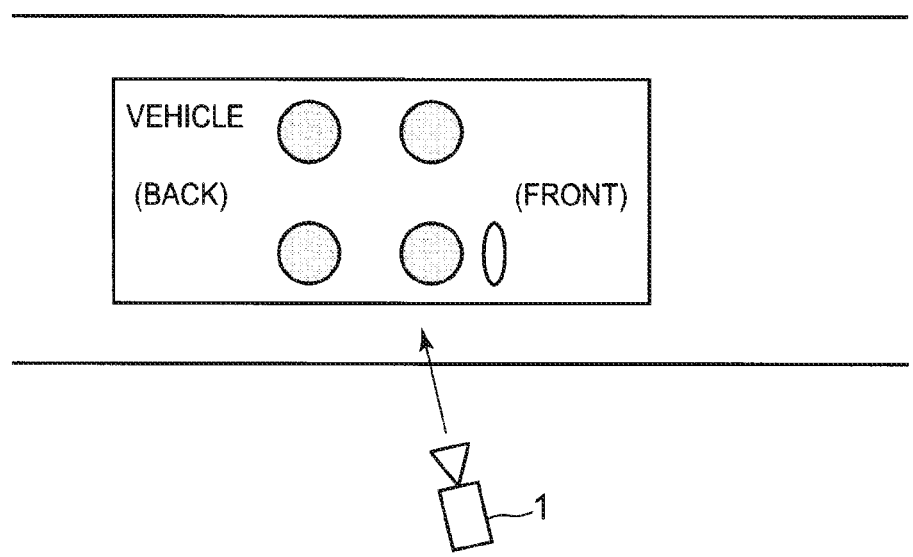
FIG. 1 It depicts an explanatory diagram illustrating an overview of a first exemplary embodiment of a passenger counting system according to the present invention.
Figure 2:
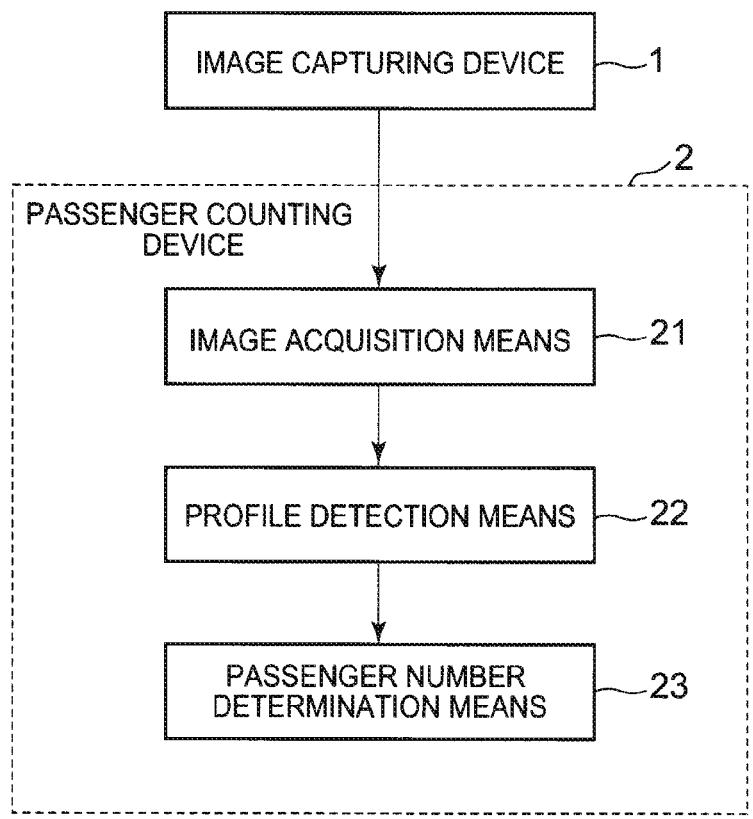
FIG. 2 It depicts a block diagram illustrating a configuration of the first exemplary embodiment of the passenger counting system according to the present invention.

FIG. 1 is an explanatory diagram illustrating an overview of the first exemplary embodiment (exemplary embodiment 1) of the passenger counting system according to the present invention. FIG. 2 is a block diagram illustrating a configuration of the first exemplary embodiment of the passenger counting system according to the present invention.

As illustrated in FIG. 1, the passenger counting system of the present exemplary embodiment includes an image capturing device 1 which is arranged outside a vehicle and which captures an image inside the vehicle from the lateral direction of the vehicle (the left or right direction when the traveling direction is defined as the forward direction) and a passenger counting device 2 that counts the number of persons present in the vehicle based on the image captured by the image capturing device 1.

The image capturing device 1 may be, for example, a still camera that captures a still image or a video camera that captures a moving image.

As illustrated in FIG. 2, the passenger counting device 2 includes an image acquisition means 21 that controls the image capturing device 1 and acquires an image in which the inside of the vehicle is captured, a profile detection means 22 that detects a profile of a person based on the image acquired by the image acquisition means 21, and a passenger number determination means 23 that determines the number of persons present in the vehicle based on a result detected by the profile detection means 22. Each means included in the passenger counting device 2 is realized by an information processing device such as, for example, hardware designed to perform specific arithmetic processing or a CPU (Central Processing Unit) that operates according to a program.

The image acquisition means 21 controls the image capturing device 1 and acquires an image in which the inside of the vehicle is captured. The image acquisition means 21 may acquire an image in which a vehicle of an image capturing target is captured by controlling the image capturing device 1 according to passing timing of the vehicle, which is obtained from a sensor that detects the presence of the vehicle, such as, for example, a passage sensor and a weight sensor arranged on a course on which the vehicle travels. The image acquisition means 21 may control the image capturing device 1 to continuously capture a plurality of images and to input the images to the image acquisition means 21, and the image acquisition means 21 may determine whether or not an image of the inside of a vehicle is captured by performing image processing such as detecting a window frame by template matching and acquire an image in which the inside of a vehicle, which is an image capturing target, is captured. Further, the image acquisition means 21 may acquire a plurality of images in which a vehicle being an image capturing target is captured.

For example, when the image acquisition means 21 controls the image capturing device 1 by using a passage sensor, the image capturing device 1 and the passage sensor are installed after the positional relationship between the image capturing device 1 and the passage sensor are determined so that the image capturing device 1 can capture a person on a back seat when the passage sensor detects a vehicle. The image acquisition means 21 can capture the person on the back seat at a desired angle of view by capturing an image of the inside of the vehicle by controlling the image capturing device 1 according to detection timing of the passage sensor. Further, the image acquisition means 21 may acquire a plurality of images in which a vehicle is captured which is an image capturing target.

The profile detection means 22 calculates an image feature amount by using a partial image surrounded by a rectangle with a predetermined aspect ratio, which is obtained from an image acquired by the image acquisition means 21 (hereinafter referred to as an input image) and determines whether or not the partial image includes a profile of a person based on the image feature amount, and thereby detects a profile of a person from the input image. The profile detection means 22 may output information indicating whether or not each partial image includes a profile of a person as a detection result or may output a score indicating a likeness of a profile of a person in an image included in each partial image as a detection result.

The profile detection means 22 may determine a range of the partial image based on, for example, the size of a profile of a person in an input image, which varies according to the distance between the image capturing device 1 and the vehicle. The profile detection means 22 may limit the range of the partial image to a predetermined range in which inside of a vehicle may be captured. The profile detection means 22 may limit the range of the partial image by detecting a window frame by image processing such as template matching. The profile detection means 22 may limit the range of the partial image to an existing range of a vehicle or an existing range of a window frame, which are detected by using a laser range scanner, a passage sensor, or the like.

The profile detection means 22 can use an image feature amount based on position, orientation, strength, and luminance gradient of an edge, which can be calculated from a partial image including a profile outline from forehead to chin, as the image feature amount. The partial image may include ears and neck. In some cases, the feature is not well extracted on this occasion because an outside scene is reflected on a window glass of the vehicle, the input image is blurred due to movement of the vehicle, or the illuminance inside the vehicle is insufficient. Therefore, the profile detection means 22 may extract the image feature amount after performing preprocessing that alleviates these factors. For example, the profile detection means 22 can remove a reflection component to the window glass by using a polarizing filter by using polarization property of specular reflection component. Further, in order to remove the blur due to movement, the profile detection means 22 may estimate the degree of movement blur and perform processing that restores an image degraded due to the movement blur. Alternatively, when the illuminance is not sufficient, the profile detection means 22 may correct contrast by performing processing that uniformizes the illuminance. By doing so, it is possible to improve detection accuracy.

Further, the profile detection means 22 may perform preprocessing (for example, blurring in the vertical direction) after which vertical edges remain because a profile outline from forehead to chin and the like are mainly formed by edges in the vertical direction. Thereby, the profile detection means 22 can reduce influence of a superimposed component of reflection in directions other than the vertical direction, noise, and the like, so that the profile detection means 22 can improve a detection rate. In this case, the profile detection means 22 may estimate the strength of the superimposed component from a position from which an image of a person is not captured in the window glass of the vehicle, and control the degree of blurring in the vertical direction.

The passenger number determination means 23 determines the number of persons present in the vehicle by using the detection result of the profile detection means 22. Specifically, when the profile detection means 22 outputs whether or not each partial image includes a profile of a person, the passenger number determination means 23 determines the number of partial images determined to include a profile of a person as the number of persons present in the vehicle. When the profile detection means 22 outputs a score indicating a likeness of a profile of a person in an image included in each partial image, the passenger number determination means 23 determines the number of partial images determined to include an image that looks like a profile of a person by a comparison between the score and a predetermined score threshold value as the number of persons present in the vehicle.

When a plurality of partial images can be superimposed, the passenger number determination means 23 may integrate the partial images into one partial image. In this case, the passenger number determination means 23 may integrate all of the plurality of superimposed partial images into one partial image, or when a numerical ratio of image ratio of the superimposed partial images is greater than a predetermined numerical ratio, the passenger number determination means 23 may integrate the superimposed partial images into one partial image.

Figure 3:
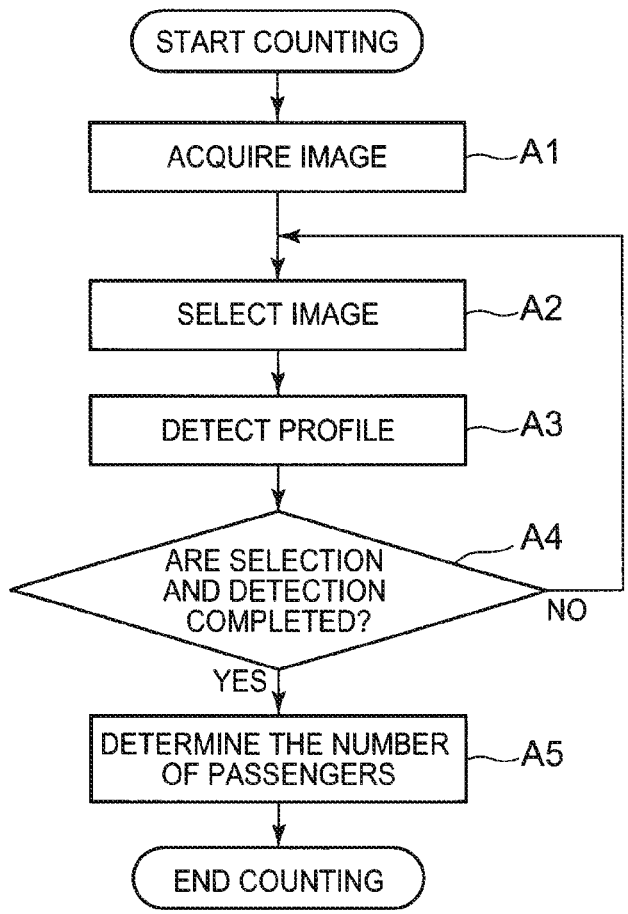
FIG. 3 It depicts a flowchart illustrating an operation of the first exemplary embodiment of the passenger counting system according to the present invention.

Next, an operation of the passenger counting system of the present exemplary embodiment will be described. FIG. 3 is a flowchart illustrating the operation of the first exemplary embodiment of the passenger counting system according to the present invention.

The image acquisition means 21 controls the image capturing device 1 and acquires an image in which the inside of a vehicle is captured (step A1). The profile detection means 22 sequentially selects partial images surrounded by a rectangle with a predetermined aspect ratio, which are obtained from an input image acquired by the image acquisition means 21 (step A2). Then, the profile detection means 22 detects a profile of a person from a partial image based on an image feature amount calculated by using the partial image (step A3).

When it is determined that the selection of all partial images from which a profile of a person should be detected and the profile detection from the input image are completed (YES in step A4), the passenger number determination means 23 determines the number of persons present in the vehicle based on a detection result related to profiles of persons outputted by the profile detection means 22 (step A5). When it is determined at step A4 that the selection and the profile detection are not completed, the processing of step A2 and step A3 is repeated.

The passenger counting system of the present exemplary embodiment detects profiles of persons from an input image obtained by capturing an image of a vehicle by a camera from outside of the vehicle from the lateral direction of the vehicle. Thereby, the passenger counting system can detect a person sitting on the back seat of the vehicle, who is possibly not able to capture sufficiently in an image obtained by photographing the vehicle from the front of the vehicle. Therefore, the passenger counting system of the present exemplary embodiment can count correctly the number of persons present in a vehicle, including persons sitting on the back seat.

Second Exemplary Embodiment

Figure 4:
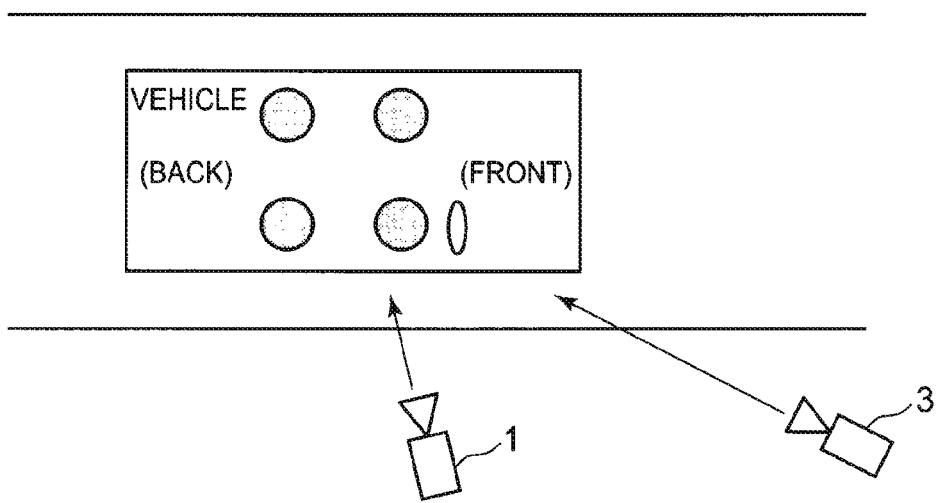
FIG. 4 It depicts an explanatory diagram illustrating an overview of a second exemplary embodiment of the passenger counting system according to the present invention.
Figure 5:
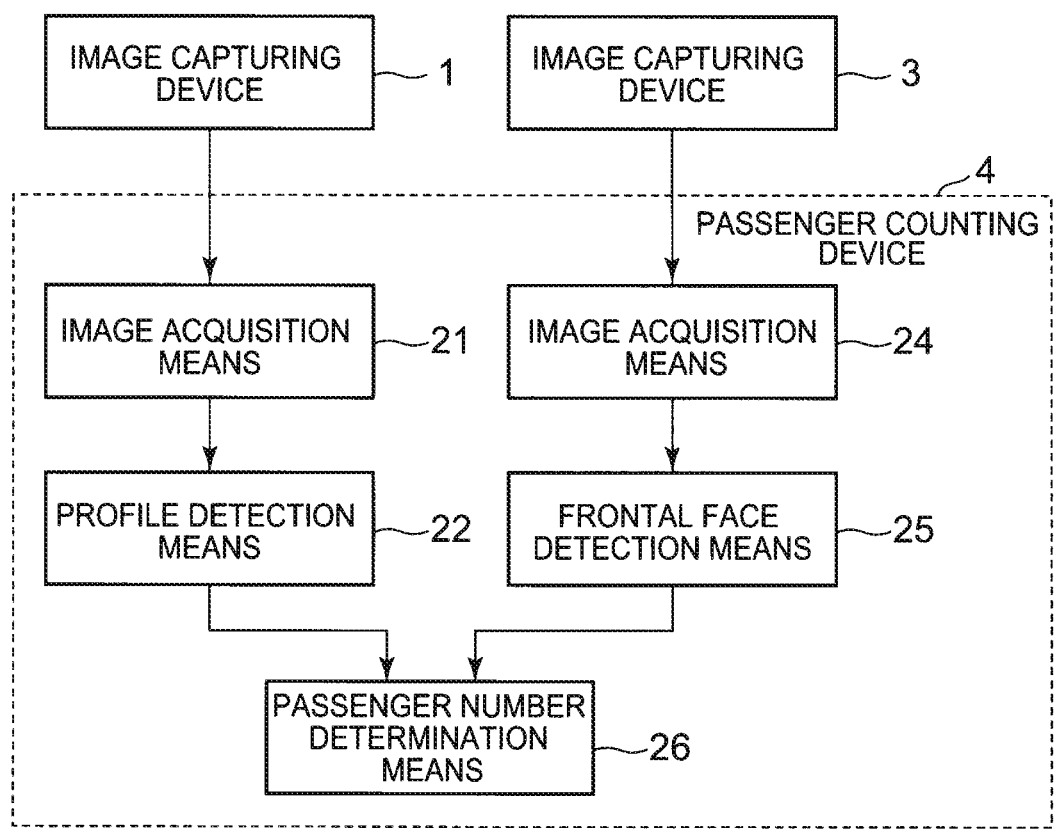
FIG. 5 It depicts a block diagram illustrating a configuration of the second exemplary embodiment of the passenger counting system according to the present invention.

FIG. 4 is an explanatory diagram illustrating an overview of the second exemplary embodiment of the passenger counting system according to the present invention. FIG. 5 is a block diagram illustrating a configuration of the second embodiment of the passenger counting system according to the present invention. In the description below, the description of the same parts as those of the first exemplary embodiment will be omitted.

As illustrated in FIGS. 4 and 5, the passenger counting system of the present exemplary embodiment is different from the passenger counting system of the first exemplary embodiment illustrated in FIG. 2 in a point that an image capturing device 3 that captures an image inside a vehicle from the front of the vehicle is further included. As illustrated in FIG. 5, a passenger counting device 4 of the passenger counting system of the present exemplary embodiment is different from the passenger counting system of the first exemplary embodiment in a point that the passenger counting device 4 further includes an image acquisition means 24 and a frontal face detection means 25 and includes a passenger number determination means 26 instead of the passenger number determination means 23.

The image capturing device 3 may be a still camera that captures a still image or a video camera that captures a moving image.

The image acquisition means 24 controls the image capturing device 3 and acquires an image in which the inside of the vehicle is captured. At this time, the image acquisition means 24 may acquire an image in which a vehicle of an image capturing target is captured by controlling the image capturing device 3 according to passing timing of the vehicle, which is obtained from a sensor that detects the presence of the vehicle, such as a passage sensor and a weight sensor arranged on a course on which the vehicle travels. The image acquisition means 24 may determine whether or not an image of the inside of the vehicle is captured in each image obtained by controlling the image capturing device 3 to continuously capture a plurality of images by image processing such as detecting a window frame by template matching, and may acquire an image in which the inside of the vehicle, which is an image capturing target, is captured.

For example, when the image acquisition means 24 controls the image capturing device 3 by using a passage sensor, the image capturing device 3 and the passage sensor are installed after the positional relationship between the image capturing device 3 and the passage sensor are determined so that the image capturing device 3 can capture a person on a front seat when the passage sensor detects a vehicle. The image acquisition means 24 can capture the person on the front seat at a desired angle of view by capturing an image of the inside of the vehicle by controlling the image capturing device 3 according to detection timing of the passage sensor. Further, the image acquisition means 24 may acquire a plurality of images in which a vehicle is captured which is an image capturing target.

The frontal face detection means 25 calculates the image feature amount by using a partial image surrounded by a rectangle with a predetermined aspect ratio, which is obtained from an image (hereinafter referred to as an input image) acquired by the image acquisition means 24. Then, the frontal face detection means 25 detects a frontal face of a person from the input image by determining whether or not the partial image includes a frontal face of a person based on the image feature amount. The frontal face detection means 25 may output information indicating whether or not each partial image is a frontal face of a person as a detection result or may output a score indicating a likeness of a frontal face of a person in an image included in each partial image as a detection result.

The frontal face detection means 25 may determine a range of the partial image based on the size of a frontal face of a person in an input image, which varies according to the distance between the image capturing device 3 and the vehicle. The frontal face detection means 25 may limit the range of the partial image to a predetermined range in which inside of a vehicle may be captured. The frontal face detection means 25 may limit the range of the partial image to a range in which the inside of a vehicle is captured, which is determined by image processing such as detecting a window frame by template matching. The frontal face detection means 25 may limit the range of the partial image to an existing range of a vehicle or an existing range of a window frame, which are detected by using a laser range scanner, a passage sensor, or the like.

The passenger number determination means 26 determines the number of persons present in the vehicle based on a person profile detection result obtained by the profile detection means 22 and a person frontal face detection result obtained by the frontal face detection means 25. Specifically, the passenger number determination means 26 determines the maximum value, the average value, or the sum of the number of profiles obtained by the profile detection means 22 and the number of frontal faces obtained by the frontal face detection means 25 as the number of persons present in the vehicle.

When the detection result of the profile detection means 22 is the information indicating whether or not each partial image includes a profile of a person, the number of profiles is the number of partial images determined to be a profile of a person. When the detection result of the profile detection means 22 is the score indicating a likeness of a profile of a person of each partial image, the number of profiles is the number of partial images determined to be like a profile of a person by a comparison between the score and a predetermined score threshold value. When the detection result of the frontal face detection means 25 is information indicating whether or not each partial image includes a frontal face of a person, the number of frontal faces is the number of partial images determined to include a frontal face of a person. When the detection result of the frontal face detection means 25 is the score indicating a likeness of a frontal face of a person of an image included in each partial image, the number of frontal faces is the number of partial images including an image determined to be like a frontal face of a person by a comparison between the score and a predetermined score threshold value.

At this time, when a plurality of partial images can be superimposed, the passenger number determination means 26 may integrate the partial images into one partial image. In this case, the passenger number determination means 26 may integrate all of the plurality of superimposed partial images into one partial image, or when a numeral ratio of the superimposed partial images is greater than a predetermined numeral ratio, the passenger number determination means 26 may integrate the superimposed partial images into one partial image.

As another specific example, the passenger number determination means 26 associates a position of each partial image that is determined to include a face of a person by the profile detection means 22 and the frontal face detection means 25 with a position of a seat inside the vehicle that is an image capturing target. Then, the passenger number determination means 26 determines whether or not the seat position inside the vehicle of each partial image that is determined to include a profile of a person by the profile detection means 22 overlaps the seat position inside the vehicle of each partial image that is determined to include a frontal face of a person by the frontal face detection means 25. Thereby, the passenger number determination means 26 determines a total number of seat positions where persons sit and may determine the number of persons present in the vehicle based on the total number. For example, when the number of profiles is four, the number of frontal faces is four, and the number of overlapped seat positions is three, the number of seat positions that do not overlap each other is one in each number, so that the passenger number determination means 26 determines that the total number of persons is five.

Figure 6:
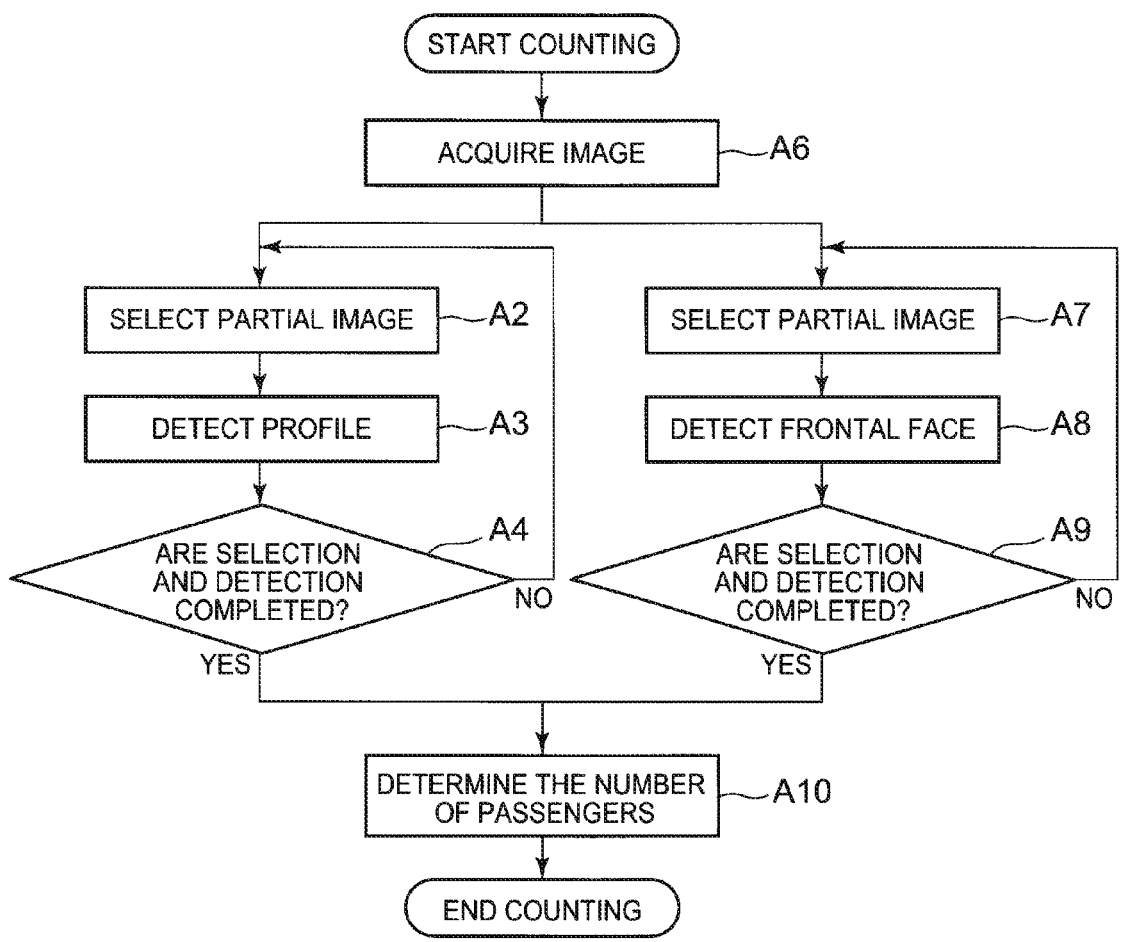
FIG. 6 It depicts a flowchart illustrating an operation of the second exemplary embodiment of the passenger counting system according to the present invention.

Next, an operation of the passenger counting system of the present exemplary embodiment will be described. FIG. 6 is a flowchart illustrating the operation of the second exemplary embodiment of the passenger counting system according to the present invention.

The image acquisition means 21 and the image acquisition means 24 control the image capturing device 1 and the image capturing device 3, respectively, and acquire an image in which the inside of a vehicle is captured (step A6). The profile detection means 22 sequentially selects partial images surrounded by a rectangle with a predetermined aspect ratio from an image (hereinafter referred to as a lateral direction input image) acquired by the image acquisition means 21 (step A2). Further, the profile detection means 22 detects a profile of a person from a partial image based on an image feature amount calculated from the partial image (step A3).

The frontal face detection means 25 sequentially selects partial images surrounded by a rectangle with a predetermined aspect ratio from an image (hereinafter referred to as a front input image) acquired by the image acquisition means 24 (step A7). The frontal face detection means 25 detects a frontal face of a person from a partial image based on an image feature amount calculated from the partial image (step A8). When it is determined that the selection of all partial images from which a profile of a person should be detected and the profile detection from the lateral direction input image are completed (YES in step A4) and it is determined that the selection of all partial images from which a frontal face of a person should be detected and the frontal face detection from the front input image are completed (YES in step A9), the passenger number determination means 26 determines the number of persons present in the vehicle based on a detection result related to profiles of persons and a detection result related to frontal faces of persons (step A10).

The passenger counting system of the present exemplary embodiment detects persons based on an input images obtained by capturing images of a vehicle by a camera from outside of the vehicle from the lateral direction and the front direction of the vehicle. Thereby, the passenger counting system of the present exemplary embodiment has an effect that it is possible to more correctly count the number of persons present in the vehicle by reducing blind areas due to components of the vehicle and persons in the vehicle in addition to the effect of the passenger counting system of the first exemplary embodiment.

Figure 7:
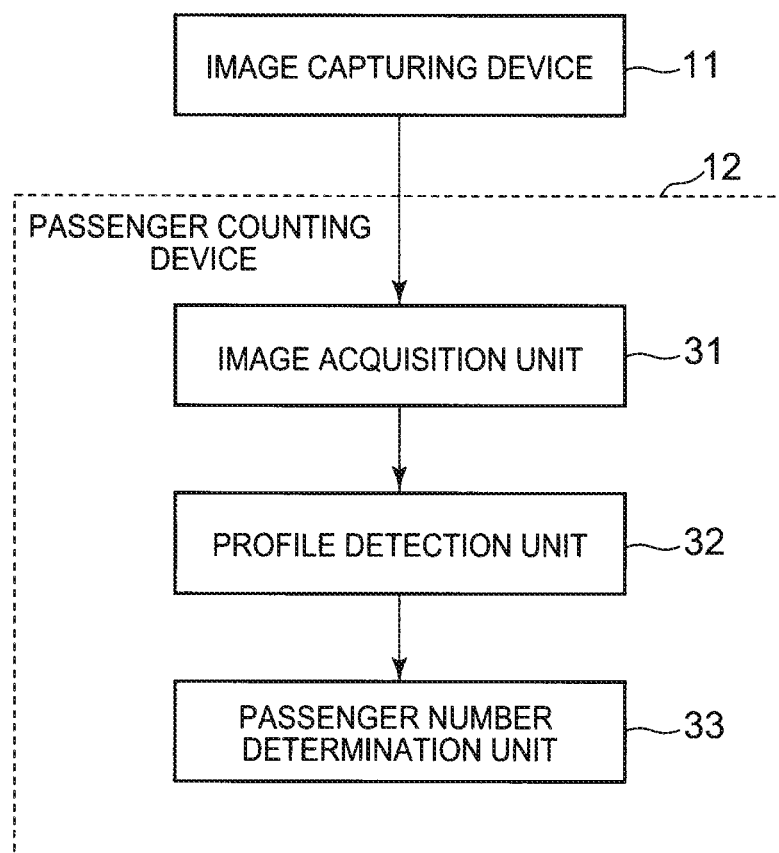
FIG. 7 It depicts a block diagram illustrating a main part of the passenger counting system according to the present invention.

FIG. 7 is a block diagram illustrating a main part of the passenger counting system according to the present invention. The passenger counting system includes an image capturing device 11 which is arranged outside a vehicle and which captures an image of the vehicle from the lateral direction of the vehicle, an image acquisition unit 31 that controls the image capturing device 11 and acquires an image in which the inside of the vehicle is captured as an input image, a profile detection unit 32 that detects a profile of a person from a partial image obtained from the input image based on an image feature amount calculated by using the partial image and outputs a detection result, and a passenger number determination unit 33 that determines the number of persons present in the vehicle based on the detection result.

(1) A passenger counting system including an image capturing device (for example, the image capturing device 1) which is arranged outside a vehicle and which captures an image of the vehicle from the lateral direction of the vehicle, an image acquisition means (for example, the image acquisition means 21) that controls the image capturing device and acquires an image in which the inside of the vehicle is captured as an input image, a profile detection means (for example, the profile detection means 22) that detects a profile of a person from a partial image obtained from the input image based on an image feature amount calculated by using the partial image and outputs a detection result, and a passenger number determination means (for example, the passenger number determination means 23) that determines the number of persons present in the vehicle based on the detection result.

(2) The passenger counting system may be configured so that the image acquisition means acquires an image in which the inside of the vehicle is captured as an input image by controlling the image capturing device according to passing timing of the vehicle, which is obtained by a sensor that is arranged on a course on which the vehicle travels and detects the presence of the vehicle.

(3) The passenger counting system may be configured so that the image acquisition means determines whether or not the inside of the vehicle is captured in a plurality of images that is continuously captured by detecting a window frame by using image processing using template matching and acquires an image in which the inside of the vehicle is captured as an input image.

(4) The passenger counting system may be configured so that the profile detection means uses an image feature amount based on position, orientation, strength, and luminance gradient of an edge, which can be calculated from a partial image including a profile outline from forehead to chin, as the image feature amount.

(5) The passenger counting system may be configured so that the profile detection means applies preprocessing to the input image so that vertical edges remain in the input image.

(6) The passenger counting system may be configured so that the profile detection means limits a range in the input image, from which a partial image is cut out, to a predetermined range in which inside of a vehicle may be captured, a range in which the inside of a vehicle, which is determined by detecting a window frame by using image processing using template matching, is captured, or an existing range of a vehicle or an existing range of a window frame, which are detected by using a laser range scanner or a passage sensor.

(7) The passenger counting system may be configured so that the passenger number determination means determines the number of partial images that are determined to include a profile of a person by the profile detection means as the number of persons present in the vehicle.

(8) A passenger counting system including an image capturing device (for example, the image capturing device 1 and the image capturing device 3) which is arranged outside a vehicle and which captures an image of the vehicle from the lateral direction and the front direction of the vehicle, an image acquisition means (for example, the image acquisition means 21 and the image acquisition means 24) that controls the image capturing device, acquires an image in which the inside of the vehicle is captured from the lateral direction as a lateral direction input image, and acquires an image in which the inside of the vehicle is captured from the front direction as a front input image, a face detection means (for example, the profile detection means 22 and the frontal face detection means 25) that detects a profile of a person from a partial image in the lateral direction input image and detects a frontal face of a person from a partial image in the front input image based on image feature amounts calculated by using the partial images obtained from the lateral direction input image and the front input image and outputs a detection result, and a passenger number determination means (for example, the passenger number determination means 26) that determines the number of persons present in the vehicle based on the detection result.

(Supplementary note 1) A passenger counting system may be configured so that when a plurality of partial images that is determined to include a profile of a person by a profile detection means can be superimposed, a passenger number determination means performs processing to integrate the plurality of partial images into one partial image and determines the number of partial images determined to include a profile of a person after the processing as the number of persons present in the vehicle.

This application is based upon and claims the benefit of priority of the prior Japanese Patent Application No. 2012-231729, filed on Oct. 19, 2012, the entire contents of which are incorporated herein by reference.

While the claimed invention has been described with reference to the exemplary embodiments, the claimed invention is not limited to the exemplary embodiments described above. Various modifications apparent to those skilled in the art may be made on the configuration and details of the claimed invention within the scope of the claimed invention.

INDUSTRIAL APPLICABILITY

The present invention is applied to usages such as a system that determines a toll of a toll road according to the number of persons present in the vehicle and a system that determines whether or not to allow a vehicle to travel in a traffic lane according to the number of persons present in the vehicle.

REFERENCE SIGNS LIST 1, 3 Image capturing device
2, 4 Passenger counting device
21, 24 Image acquisition means
22 Profile detection means
23, 26 Passenger number determination means
25 Frontal face detection means

The invention claimed is:

1. A passenger counting system comprising:
a first image capturing device having a lens, the first image capturing device being arranged outside a vehicle for capturing a lateral image of inside of the vehicle from a lateral direction of the vehicle;
a second image capturing device having a lens, the second image capturing device being arranged outside the vehicle for capturing a frontal image of inside of the vehicle from a frontal direction of the vehicle; and
one or more processors configured to:
detect a number of faces from the lateral image;
detect a number of faces from the frontal image; and
determine a number of persons present in the vehicle based on the number of faces detected from the lateral image and the number of faces detected from the frontal image.

2. The passenger counting system according to claim 1, the processor further configured to:
detect a number of profiles in order to detect the number of faces from the lateral image;
detect a number of frontal faces in order to detect the number of faces from the frontal image,
wherein the processor determines a number of persons present in the vehicle based on the number of profiles and the number of frontal faces.

3. The passenger counting system according to claim 1, the processor further configured to:
when a position of a face detected from the lateral image and a position of a face detected from the frontal image overlap, count the overlapping faces as one person present in the vehicle.

4. A passenger counting method comprising:
capturing a lateral image of inside of a vehicle from a lateral direction of the vehicle by a first image capturing device arranged outside the vehicle;
capturing a frontal image of inside of the vehicle from a frontal direction of the vehicle by a second image capturing device arranged outside the vehicle;
detecting a number of faces from the lateral image;
detecting a number of faces from the frontal image; and
determining a number of persons present in the vehicle based on the number of faces detected from the lateral image and the number of faces detected from the frontal image.

5. A non-transitory computer readable information recording medium storing a passenger counting program that, when executed by a processor, performs a method for:
acquiring a lateral image of inside of a vehicle captured from a lateral direction of the vehicle;
acquiring a frontal image of inside of the vehicle captured from a frontal direction of the vehicle;
detecting a number of faces from the lateral image;
detecting a number of faces from the frontal image; and
determining a number of persons present in the vehicle based on the number of faces detected from the lateral image and the number of faces detected from the frontal image.

* * * * *